Patented June 8, 1926.

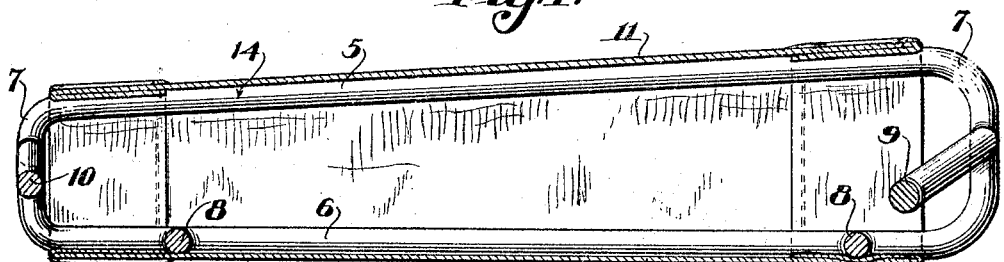
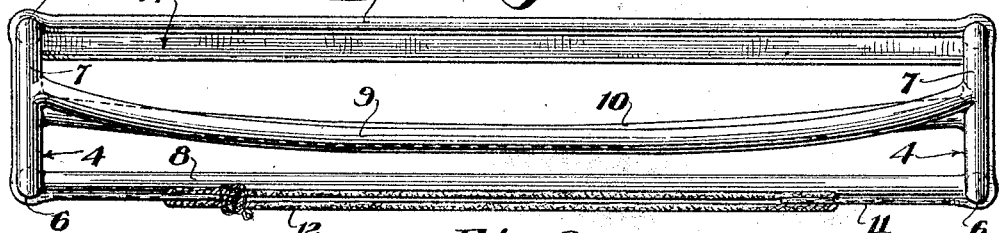
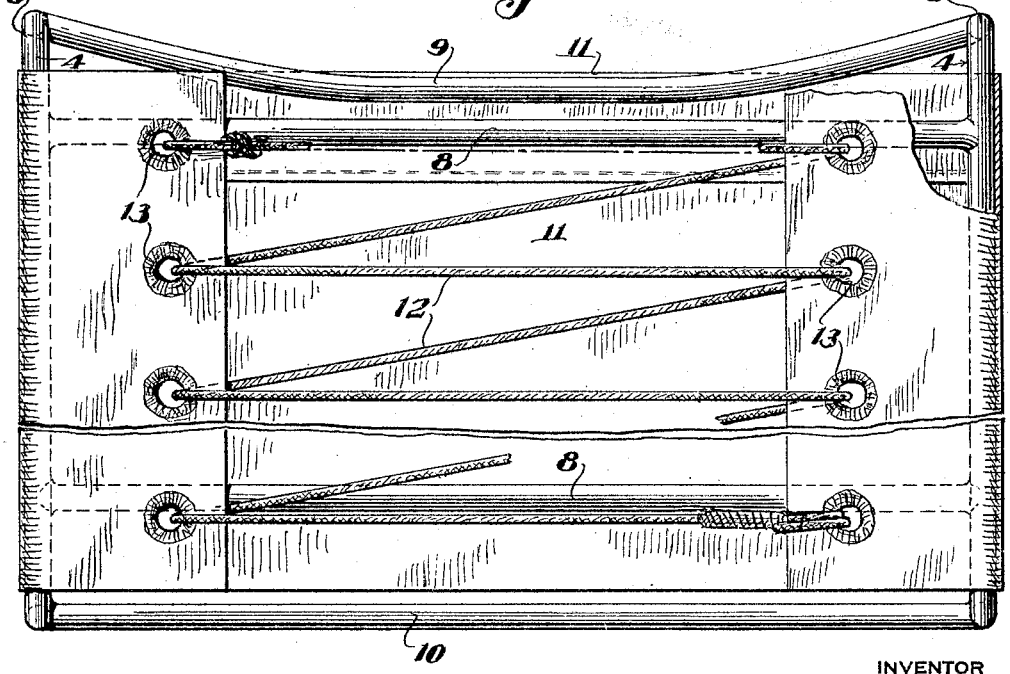

1,587,705

UNITED STATES PATENT OFFICE.

JOE FRANK DOZIER, OF NASHVILLE, TENNESSEE.

AUTOMOBILE SEAT.

Application filed August 4, 1924. Serial No. 730,025.

This invention relates to seats adapted particularly for use in motor vehicles, though capable of separate use.

An object of the invention is to provide an auxiliary seat to be applied to the usual motor vehicle seat, possessing shock absorbing qualities, whereby the occupant may more comfortably ride and be protected against the severe jolts and shocks incident to travel of the vehicle over rough roads.

A further object of the invention is to provide a seat of such construction that currents of air are free to pass in close proximity to the seat and back of the occupant, whereby the seat is kept cool under severe atmospheric conditions.

A still further object of the invention is to provide a seat of the character mentioned and for the purposes thus generally stated which is of simple construction and light weight; which is constructed in such manner as to properly and comfortably support its occupant, which involves means wherein the degree of resiliency of the body supporting element may be readily governed; and which will prove highly practical and efficient in use.

With these objects in view, together with others which will appear as the description proceeds, the invention consists in the novel construction, arrangement and combination of parts all as will be described more fully hereinafter, illustrated in the drawings, and particularly pointed out in the claims.

In the drawings:—

Figure 1 is a sectional view taken longitudinally through an auxiliary seat constructed in accordance with my invention;

Figure 2 is a front elevation of the seat; and

Figure 3 is a bottom plan view of the seat.

The improved seat structure comprises an open framework of substantially box-like form; including a pair of side frames of substantially oblong-quadrilateral construction, rigidly connected together in parallelism by cross rods which serve to support the framework, and which also operate to equally distribute the shocks and jars to which the structure is subjected.

In the present instance, the framework is formed of metal bars or rods, although it will be understood that wood or other materials might be used. The side frames 4 each comprise spaced upper and lower straight bars 5 and 6, connected together at their extremities by the curved end portions 7, the latter being of short length so that the frames are of oblong shape. The upper bar 5 of each frame inclines upwardly slightly from the rear to the front of the framework, and the end portion 7 at the front is longer than the one at the rear, to provide a proper pitch for the seat supporting or cover member hereinafter described.

The frames 4 are held rigidly together by bottom cross rods 8 which connect the lower bars 6 of the side frames inwardly from the front and rear ends thereof, and which constitute supports for the auxiliary seat. These rods are straight throughout their lengths, and may be connected at their ends to the frame members by brazing or in any preferred manner.

The front and rear end portions 7 of the frames have rigidly secured thereto, as by brazing, the ends of connecting rods 9 and 10. The front rod 9 connects with the portions 7 substantially midway the lengths thereof, so as to be wholly below the planes of the upper bars 5 of the frames, and these rods are curved inwardly and downwardly as shown, to be disposed wholly within the front ends of the framework and a substantial distance inwardly from the front ends of the frames 4. The rear rod 10 is similarly connected at its ends to the rear connecting member or portion 7, and is bent downwardly so as to lie a substantial distance below the upper bars 5 of the frames. The curvature of the front rod 9 is greater than the rear rod 10, as shown in Fig. 1. The purpose of this is obvious.

The framework thus formed is substantially rigid, yet by reason of its construction it possesses sufficient flexibility to enable it to conform to irregularities in surfaces upon which it rests. The rods and bars may be welded or brazed together, or, it will be understood, they may be formed of tubing and connected by suitable couplings or unions, if desired. The framework is made of a size best suited to the comfortable support of the average individual, and is of a length approximately the depth of the ordinary cushion seat of a vehicle.

The seat or cover member comprises a flexible strip 11, preferably of tough fabric such as heavy duck or canvas, of a width slightly less than the length of the frames 4, and sufficiently long to stretch from one frame to the other and to have its ends pass around the said frames and beneath the framework. The ends of the fabric are connected together in any suitable manner, as, for instance, by a lacing cord 12 passing through the several eyelets in the ends of the fabric. The lacing affords a secure connecting means for the ends of the seat member, and permits of quick and easy regulation of the tension thereof, but it will be understood that other securing means, such as straps and buckles, may be employed with results equally as satisfactory.

The edges of the fabric seat are preferably hemmed, to prevent fraying and to reinforce the fabric where it is likely to be subjected to the greatest strain and wear.

The seat thus formed is light and yet sufficiently strong for its purposes. When placed properly in position upon the usual vehicle seat, the rear smaller end of the framework will be engaged with the back of the vehicle seat, and the front end of the auxiliary seat will lie approximately even with the front edge of the seat proper of the vehicle. The occupant rests upon the stretched fabric and is supported in slightly elevated position above the usual cushion seat. The slight forward pitch of the surface of the auxiliary seat gives to the legs of the occupant a more comfortable position, especially where the auxiliary seat is used by the chauffeur. The downwardly and rearwardly disposed front rod 9 lies sufficiently away from the front or forward edge of the seat fabric as not to engage with the legs of the occupant when the seat fabric is depressed.

As the vehicle moves forwardly, the current of air created will enter the framework beneath and in close contact with the seat, and will pass up at the rear of the auxiliary seat into contact with the back of the occupant. It is to promote upflow of air at the rear of the auxiliary seat that the fabric 11 is made slightly narrower than the depth of the framework, so that a space is provided between the rear cushion of the vehicle and the rear of the auxiliary seat. The current of air to cool the seat and back of the occupant may be augmented by tilting a section of the windshield or ventilator of the vehicle so as to direct a current of air toward the knees of the occupant, and this current will pass directly through the framework as stated.

As obstructions or ruts in a road are encountered, the resiliency of the seat fabric operates to absorb the shocks which otherwise would be transmitted to the occupant. The slight resiliency of the framework aids in the elimination of the shocks and jars, and contributes, with the fabric seat, to the comfort of the occupant. Due to continued use, the fabric seat may become somewhat stretched and thereby have its effectiveness impaired, but tightening of the lacing at the underside of the framework will at once restore the fabric to a proper and effective tension.

By reason of its light weight, the auxiliary seat may be readily carried about, and will serve as a cushion or seat for swings or chairs, or may be used as a lawn seat.

Changes in the form, size, proportion and minor details of construction may be made without departing from the spirit or scope of the invention, as defined in the appended claims.

What is claimed is:—

1. In a seat, a pair of side frames comprising spaced upper and lower bars connected at their ends by curved end portions, transverse rods rigidly connecting the lower bars of said frames and arranged in the horizontal plane of said bars, other transverse rods rigidly connecting the curved end portions of said frames and arranged below the plane of the upper bars thereof, the whole forming a unitary rigid structure, and a flexible cover stretched across and connecting the pair of side frames at the outside thereof and extending down beneath the lower bars of said frames, the ends of the cover at each side being adjustably connected at the bottom, the cover terminating short of the front and rear ends of the side frames so as to leave the front and rear ends of the seat open thereby providing for ventilation.

2. In a seat, a pair of side frames, each comprising spaced upper and lower bars, connecting end portions at the ends of said bars, cross rods rigidly connecting the lower bars of said frames to each other, other cross rods rigidly secured at their ends to said connecting end portions below the plane of said upper bars, one of the last-mentioned cross rods being bent inwardly and downwardly from the front and upper part of said seat so as to lie wholly within the same, and a cover member connecting said side frames.

3. In a seat, a pair of side frames each comprising spaced upper and lower bars, the said frames being of similar construction and having their upper bars inclined downwardly from the front to the rear, curved end portions connecting the front and rear ends of said bars, rods connecting the lower bars of the side frames and maintaining the latter in spaced parallel relation, other cross rods connecting the curved end portions of the side frames and arranged below the plane of the upper bars, a seat fabric stretched across and connecting the upper bars of said frames, and having its ends extended below the lower bars of said frames and also below the said rods, and means for connecting the ends of said seat fabric and giving tension thereto.

In testimony that I claim the foregoing as my own, I have hereto affixed my signature.

JOE FRANK DOZIER.